(12) United States Patent
Heselhaus

(10) Patent No.: US 7,740,302 B2
(45) Date of Patent: Jun. 22, 2010

(54) MOTOR VEHICLE HAVING A MOVABLE ROOF ASSEMBLY

(75) Inventor: Udo Heselhaus, Ibbenboren (DE)

(73) Assignee: Wilhelm Karmann GmbH, Osnabruck (DE)

( * ) Notice: Subject to any disclaimer, the term of this patent is extended or adjusted under 35 U.S.C. 154(b) by 512 days.

(21) Appl. No.: 11/676,014

(22) Filed: Feb. 16, 2007

(65) Prior Publication Data

US 2007/0194594 A1 Aug. 23, 2007

(30) Foreign Application Priority Data

Feb. 17, 2006 (DE) .................... 10 2006 007 362

(51) Int. Cl.
*B60J 7/14* (2006.01)
(52) U.S. Cl. ............ 296/116; 296/107.01; 296/107.07; 296/107.08
(58) Field of Classification Search ............ 296/107.01, 296/108, 110, 116, 107.07, 107.08, 107.09, 296/107.16
See application file for complete search history.

(56) References Cited

U.S. PATENT DOCUMENTS

| 5,788,316 A | 8/1998 | Rothe |
| 5,816,644 A | 10/1998 | Rothe et al. |
| 6,123,381 A | 9/2000 | Schenk et al. |
| 6,347,827 B1 | 2/2002 | Maass et al. |
| 2008/0224497 A1* | 9/2008 | Lewis et al. .................. 296/108 |

FOREIGN PATENT DOCUMENTS

| DE | 102004010930 | 6/2005 |
| DE | 102004033245 | 2/2006 |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A motor vehicle has a movable roof with a cover and whose front end can be secured indirectly or directly to the windshield frame. The roof, in its open position, can be stowed in the rear vehicle region. The roof has a rear region in the closed position with at least one rigid cross member and can be turned upside down and disposed on top of a part of the movable roof region adjoining it to the front in the direction of travel (F).

16 Claims, 16 Drawing Sheets

MOTOR VEHICLE HAVING A MOVABLE ROOF ASSEMBLY

REFERENCE TO RELATED APPLICATION

This application claims priority from German patent application No. DE 10 206 007 362.2, filed Feb. 17, 2006, the entire content of which is incorporated herein by reference.

FIELD OF THE INVENTION

The invention relates to a motor vehicle having a movable roof region with a cover. More particularly, the invention relates to a movable roof region having a rear end that can be opened upwardly to an inverted orientation.

BACKGROUND OF THE INVENTION

It is known to configure movable roof regions with rear ends that are not fixedly secured to the car body nor, with the help of a material retraining bracket, beneath a movable rear window on a top storage well cover which can be moved open and closed. Targa-like roofs with manually removable roof parts are known for this purpose, for example. It is also known to lower fixed roof parts of this roof region via a motor control to open them.

With roof regions covered with a cover or soft tops, whose rear ends are neither permanently fastened directly to the car body nor held under tension via a material retaining bracket which is set onto a top storage well cover under pressure, there is a lack of practical solutions to configure the roof region such that an automated stowing is made possible.

SUMMARY OF THE INVENTION

It is the underlying problem of the invention to provide a rear termination suitable for an automated roof opening for such movable roof regions.

According to one aspect of the invention, a motor vehicle includes a movable roof with a cover and whose front end can be secured indirectly or directly to the windshield frame. The movable roof can also be stowed in the rear vehicle region in its open position. The movable roof has a rear region with at least one rigid cross member. The rear region can be turned upside down to open in the manner of a front end and can be positioned on a partial region of the movable roof region adjoining it at the front in the direction of travel.

An automated opening and closing of the rear roof region is also possible with the invention when said roof region is, for example, fixed to car body structures disposed at a higher level. In addition, the rear roof region does not have to fit flush into a further car body structure, but can lie on top of such from above. Nevertheless, a flat package thereby only requiring small stowage space, in particular only a low height, can be formed from roof part portions.

According to another aspect of the invention, the rear region can be pivoted open for an opening by at least approximately 180 degrees.

When the rear region is pivoted open by at least 180° for opening, the car body structure can also lie under the line of the roof region, for example be configured in the form of rearwardly descending fins or other car body pillars so that a sporty and dynamic side line of the roof can result and the folding over of the rear region is nevertheless possible up to and over a previously almost horizontally disposed further section of the roof.

According to another aspect of the invention, the rear region can be configured like a front end and have two lateral longitudinal frame parts which are fixedly connected to the cross member. The longitudinal frame parts may be pivotable around a transverse vehicle axis and serve as levers to pivot the cross member toward the front. The cross member can be configured as a single extruded section or as a die cast plate. A plurality of individual carriers one after the other is also possible.

Provided that the region can be engaged over or under by the front end pivoted upside down in the pivoted open position, the rear region, the front roof end and a horizontal portion disposed therebetween can lie over one another such that a flat package is formed which has a relatively small longitudinal extent.

The cross member and/or the longitudinal frame parts is/are particularly advantageously provided with pillars associated with latching members for the fixing to the vehicle sides and extending the roof visually to the rear and associated with the car body. A secure holding of the rear region can thus be provided even without a dead centre point linkage or other measures disposed in the roof region for the generation of a contact pressure. A tension can be exerted on the cover solely by the latching to these pillars and with the front end at the windshield frame.

With an elevated car body structure for the holding of the roof region, the pillars can in particular be configured as side fins which can accept an upright rear window between them in the front region so that a different and interesting visual appearance results with respect to typical, obliquely running out roofs of convertibles.

Nevertheless, despite the rear region being disposed in an elevated manner, it can be connected via a linkage covered by the fins to a main bearing disposed beneath a belt line and can thus be held to the car body beneath the belt line in the open position. The fins can then stop thereabove and, for example, continue the upper side line of the side windows to the rear. The fins can particularly favorably also be lowerable themselves and thus also permit a throughgoing side line of a full convertible position with open side windows.

To make these different positions possible, the fins may be movable together with the receiving space cover, which covers the movable roof region opening at the rear of the vehicle.

The lowered roof can be stowed in an elevated position in a partial convertible position with the fins upright with respect to the full convertible position, with the fins lowered. This keeps the trunk as large as possible beneath the stowed roof assembly.

Advantages of the present invention will be readily appreciated as the same becomes better understood by reference to the following detailed description when considered in connection with the accompanying drawings.

BRIEF DESCRIPTION OF THE DRAWINGS

FIG. 16 shows a view of the vehicle rear in the full convertible position, for reasons of clarity without the stowed roof drawn in.

DETAILED DESCRIPTION OF THE INVENTION

Figure 1:
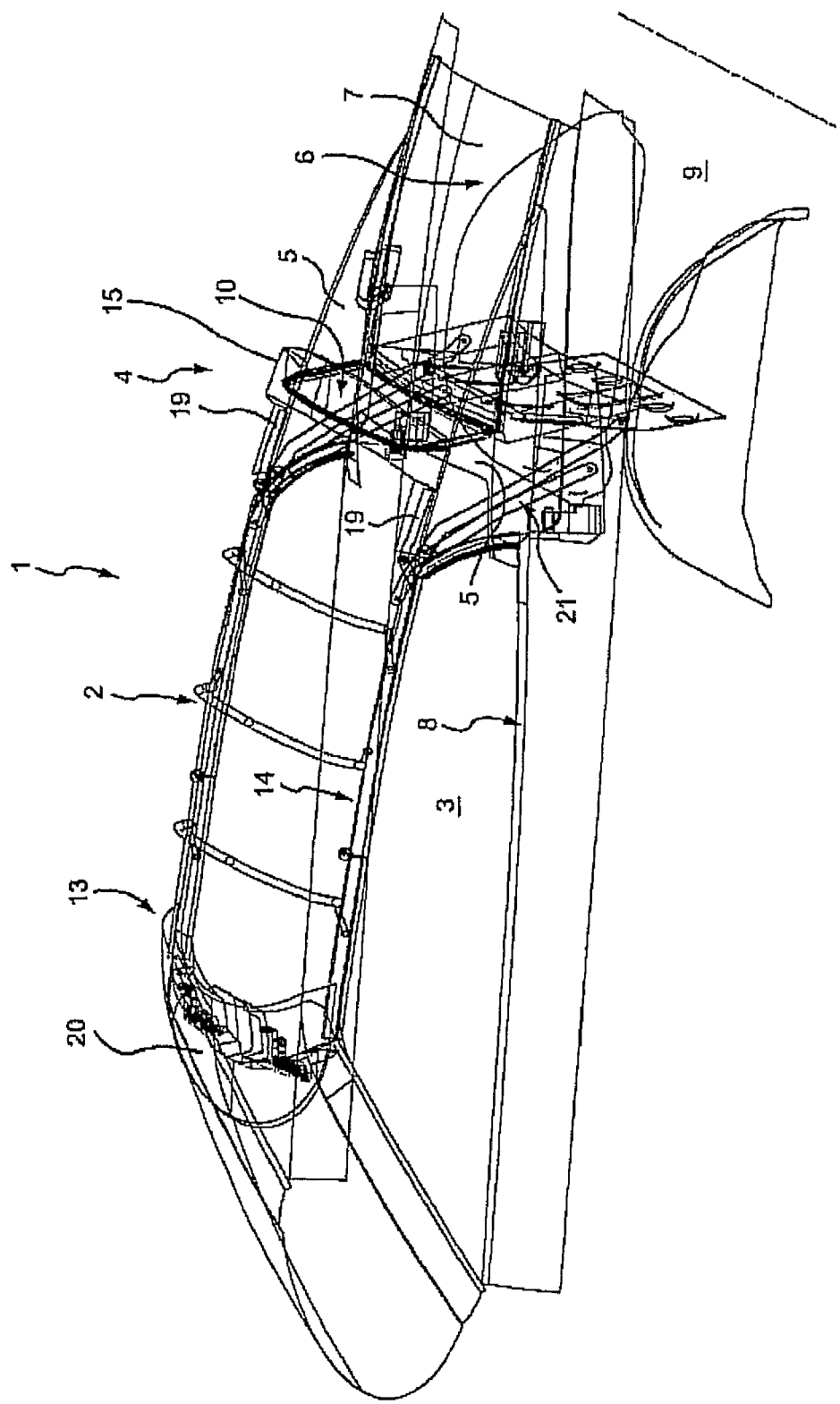
FIG. 1 shows the part of a motor vehicle in accordance with the invention at the center with respect to the longitudinal direction of the vehicle in a slightly perspective view obliquely from the rear, with the vehicle being broken off downwardly, in a closed roof position.

Referring to FIG. 1, a convertible motor vehicle is generally indicated at 1. The vehicle 1 includes a movable roof assembly 2 which, in the closed position, extends above side windows 3 of a passenger compartment. The rear end 4 of the roof lies on lateral roof extensions, or fins 5, which are associated with the car body 9 and are not components of the movable roof assembly 2. Other car body pillars or structural parts of the car body 9 can also be provided instead of the fins 5 as abutments for rear roof end 4 of the roof. The front end 13, or roof peak, of the roof assembly 2 can be secured indirectly or directly to a windshield frame 20. The roof assembly 2 can be stowed in its open position in the rear region of the vehicle 1 beneath the plane 6 of a top storage well cover 7.

In this embodiment, the movable roof assembly 2 is completely covered by a flexible cover. The roof is a soft top assembly, which is shown as different hoops in the figures. The cover itself is not shown.

Figure 2:
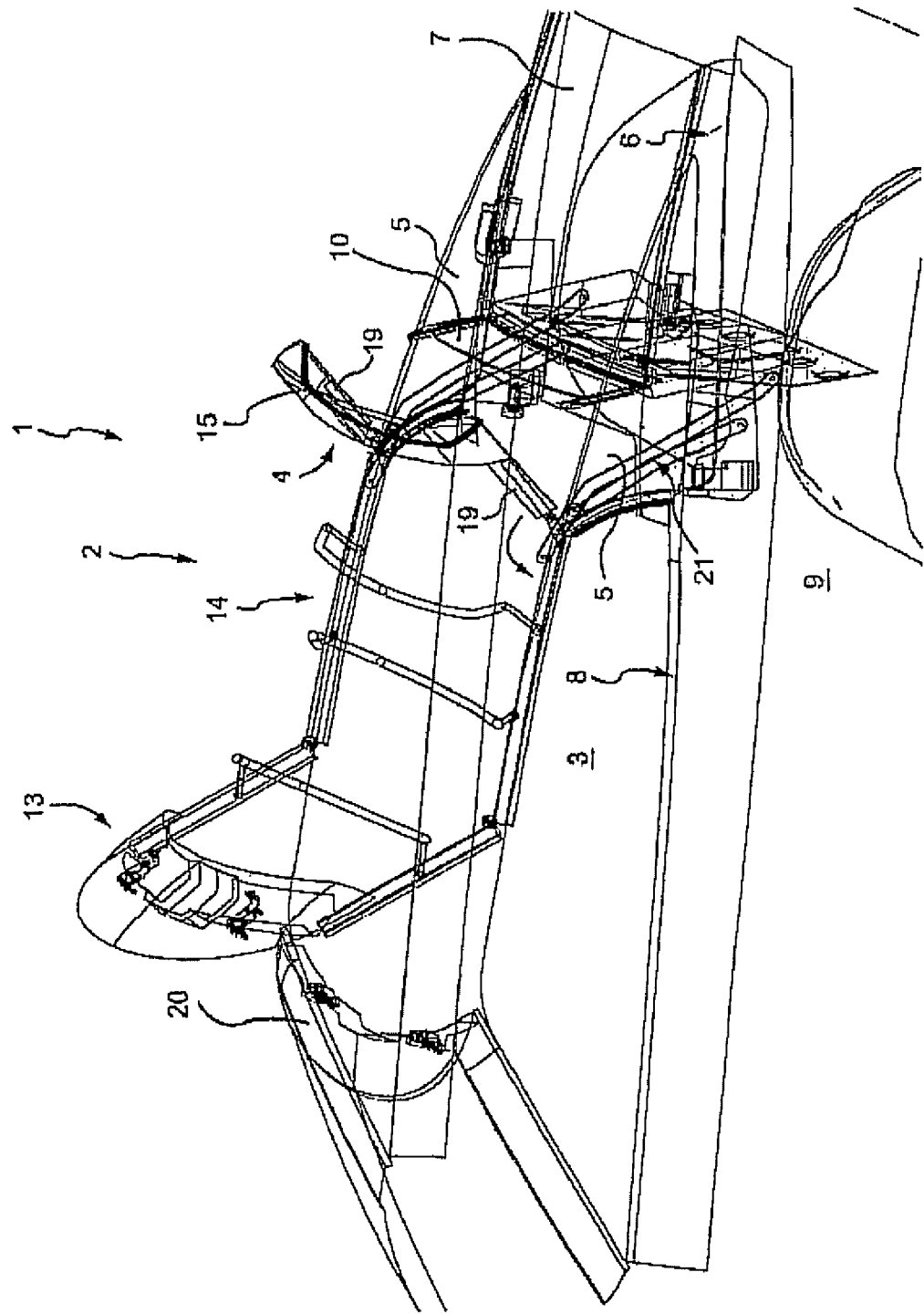
FIG. 2 shows the vehicle in accordance with FIG. 1 during the pivoting open of the roof front end and of the rear region.
Figure 3:
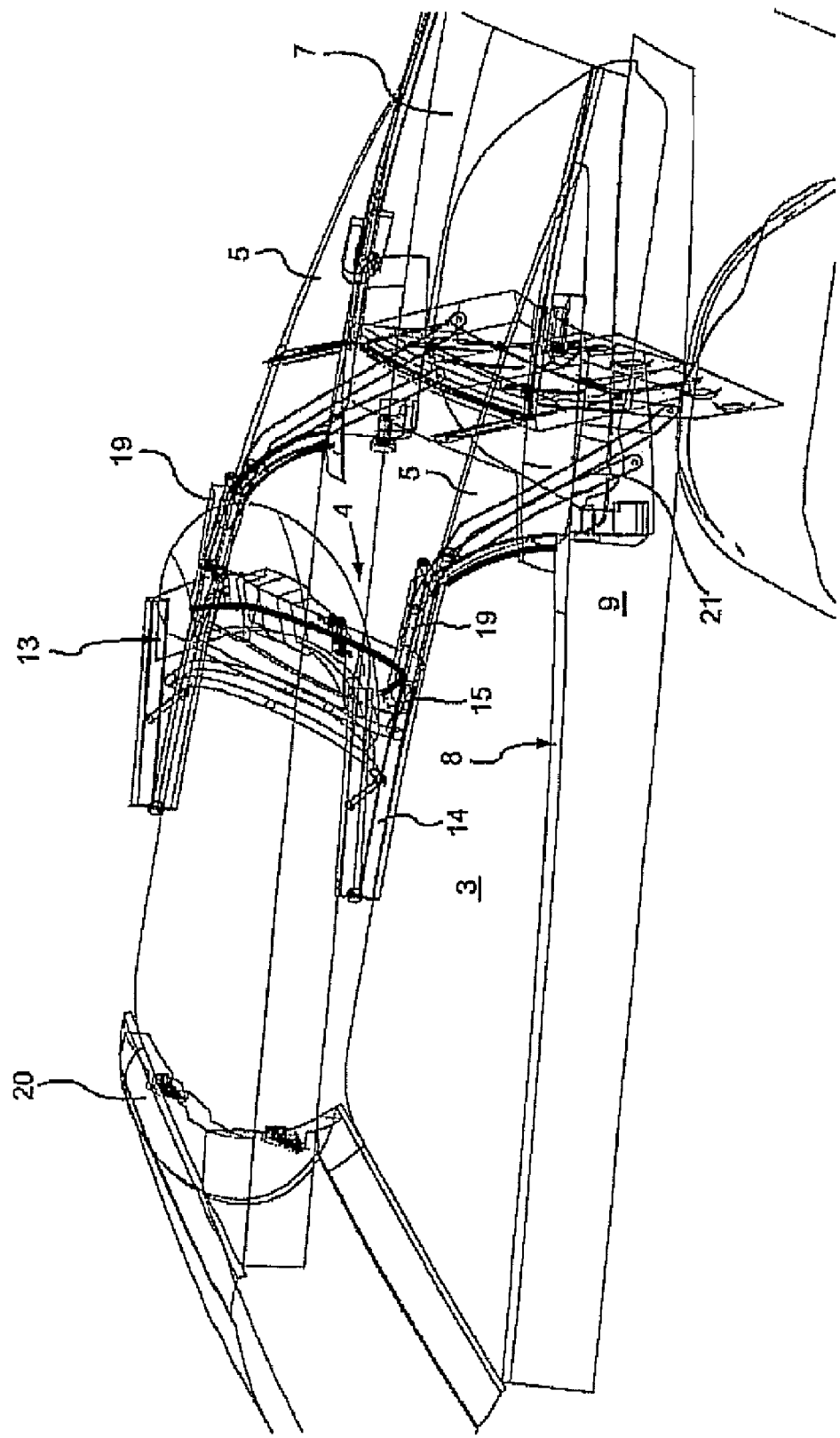
FIG. 3 shows the vehicle in accordance with FIG. 2 in a position with the rear region completely turned upside down with a likewise turned roof front end placed above it.
Figure 4:
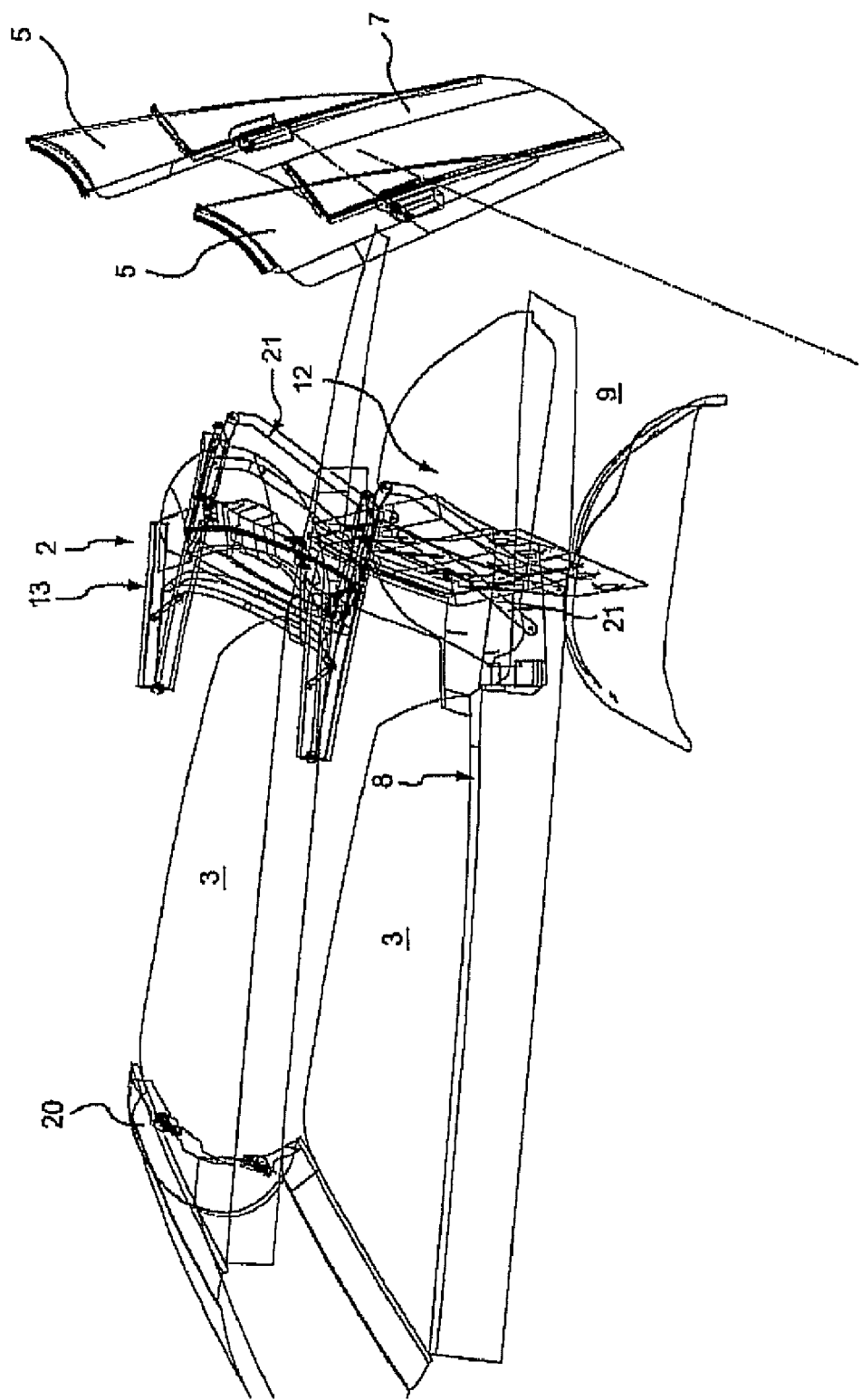
FIG. 4 shows the further roof opening from the position in accordance with FIG. 3 after the pivoting open of a rear top storage well cover during the displacement downwardly and toward the rear of the movable roof.
Figure 5:
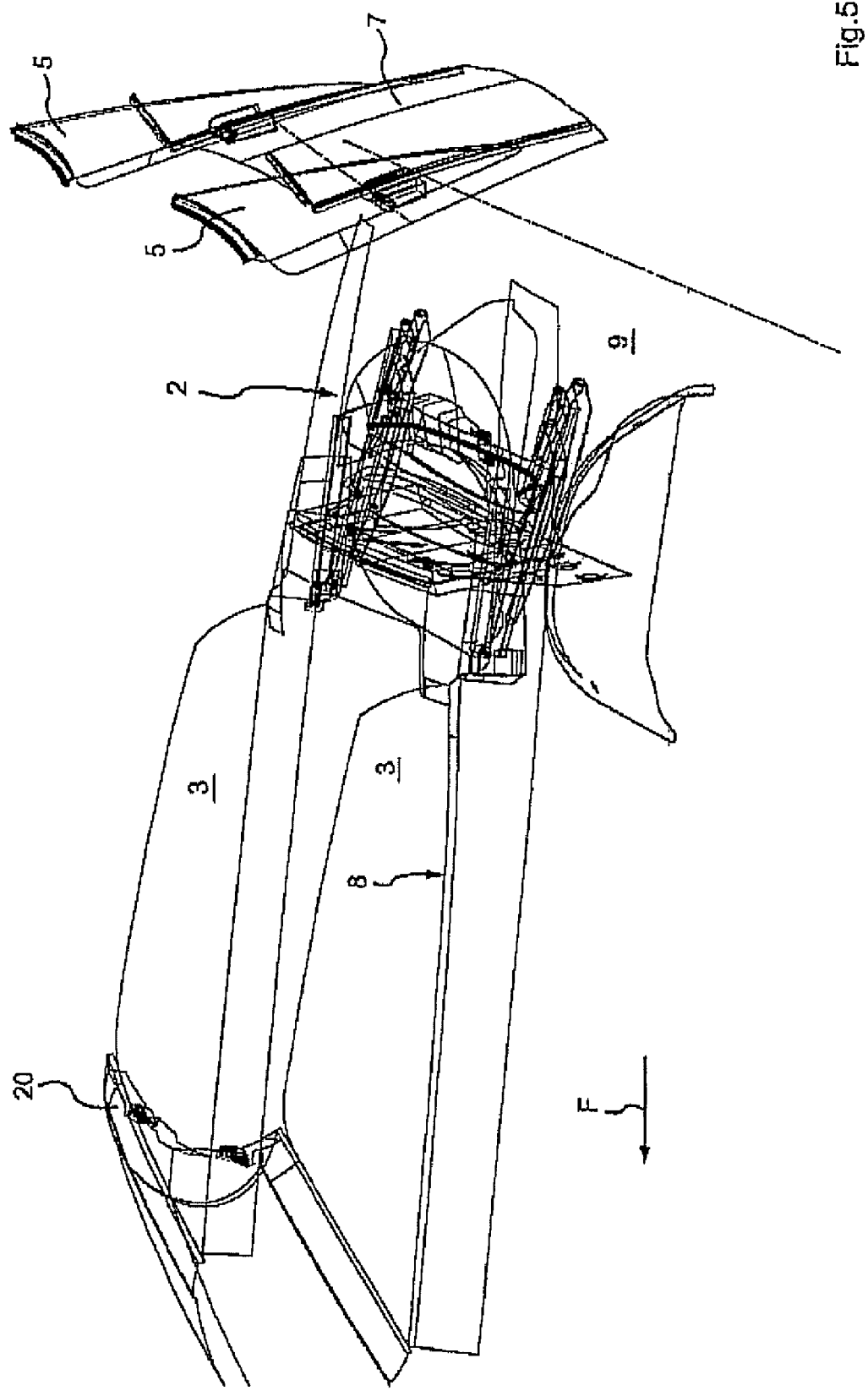
FIG. 5 shows a similar view to FIG. 4 with a fully opened, stowed roof and a top storage well cover still open thereabove.

To cover a long roof assembly 2 for a vehicle with two or more rows of seats and to provide good sealing with respect to the fins 5 or other pillars, the roof assembly 2 extends rearwardly up to and over the start of the fins 5 into a contact position thereon. The rear end 4 includes a rigid cross member 15 which, like the front end of the roof 13, can be pivoted open in an upwardly direction (transition from FIG. 1 to FIG. 3). The rear end is turned upside down and disposed on top of the generally horizontally disposed part 14 of the roof assembly 2. The rear end may then be placed on the part 14 before the front end of the roof 13 folds on top of it as a third layer (FIG. 2, FIG. 3). Alternatively, the rear end 4 of the roof can be disposed beneath by the front end 13 in the open position.

The fins 5 extend the roof visually toward the rear and have a triangular shape, when viewed from the side. The fins 5 may extend downwardly from the upper edge of the side windows 3 to the arched upper plane 6 of the rear cover 7, as shown in FIG. 1. The upper plane 6 may extend the window belt line 8 of the car body 9 toward the rear. The fins 5 are narrow and can widen downwardly so that they also have a triangular shape in cross-section.

The rear cross member 15 of the rear end 4 can pivot more than 180° when opening such that the rear end 4 lies on the upper edges of the downwardly descending fins when closed (FIG. 1) and lies on the part 14 when open. When open, the rear end 4 is turned upside down (FIG. 2) and may be disposed completely horizontally.

The rear end of the roof also comprises, in addition to the cross member 15, lateral longitudinal frame parts 19 which are fixedly connected to the cross member 15 and may lie on the upper edges of side windows 3. For this purpose, the longitudinal frame parts 19 are provided with corresponding seals. The cross member 15 can itself be configured in different manners. For example, it may be an extruded section made of steel or light metal or may be formed as a large-area plate member or frame member, for example a die cast. It may also be formed as a plurality of parallel cross members. Such a frame member may extend around a window part to allow as much light-into the interior space as possible.

The rear roof region 4 is latchable either via the longitudinal frame parts 19 and/or via the cross member 15 to car body structures, for example to the fins 5. These parts may be provided with corresponding engagement hooks or similar locks. The locks may face downwardly from the rear end 4 and engage cut-outs on the upper edges of the fins 5 since the rear end 4 pivots from above onto the fins.

The roof assembly is moved by a linkage 21, which is covered by the fins 5 in the closed position. The linkage is connected to a main bearing beneath the window belt line 8. Illustratively, the linkage 21 is configured as a four-bar linkage in the form of a parallelogram.

A rear window 10 is arranged between the fins 5 or is disposed in front of them in the longitudinal direction of the vehicle and stands substantially upright. In the illustrated embodiment, the rear window has a small inclination of less than 20° with respect to the vertical. In the illustrated embodiment, the rear window 10 is capable of opening. It is received in a box 11 and can be lowered into it (FIGS. 6-16). The upper edge of the rear window 10 can be beneath or in the plane 6 in the lowered position. Guides can be provided at the inner sides of the fins 5 in the form of lateral frames for the rear window 10 that bound the width of the rear window 10.

The fins 5 in the illustrated embodiment are disposed on the top storage well cover 7. The cover 7 can open to the rear to accept the roof assembly 2 (FIGS. 6-8) and, in the closed position (FIGS. 6 and 10), covers a receiving space 12 for the opened roof assembly 2. The fins 5 are movable along with the cover 7 when it opens. They thereby do not restrict the width of the passage space for the roof assembly 2 cover 7 is open. Depending on the vehicle geometry, the fins 5 can also be arranged laterally next to the movable cover 7 on the car body.

The fins 5 can move downwardly with respect to the cover 7 when the cover is open. For example, the fins 5 may be pivotable around an axis 16. This axis 16 extends substantially transversely to the main direction of extent of the respective fin 5 and has a considerable rise with respect to a horizontal axis in the direction of a vertical longitudinal central plane of the vehicle. The fin 5 thereby rotates with respect to the top storage well cover 7 from an upright standing normal position with the roof closed into a generally horizontal storage position beneath the cover 7. The fins 5 may lie above the stowed roof assembly 2 when the cover 7 is closed.

A full convertible vehicle is not required for the invention.

Figure 6:
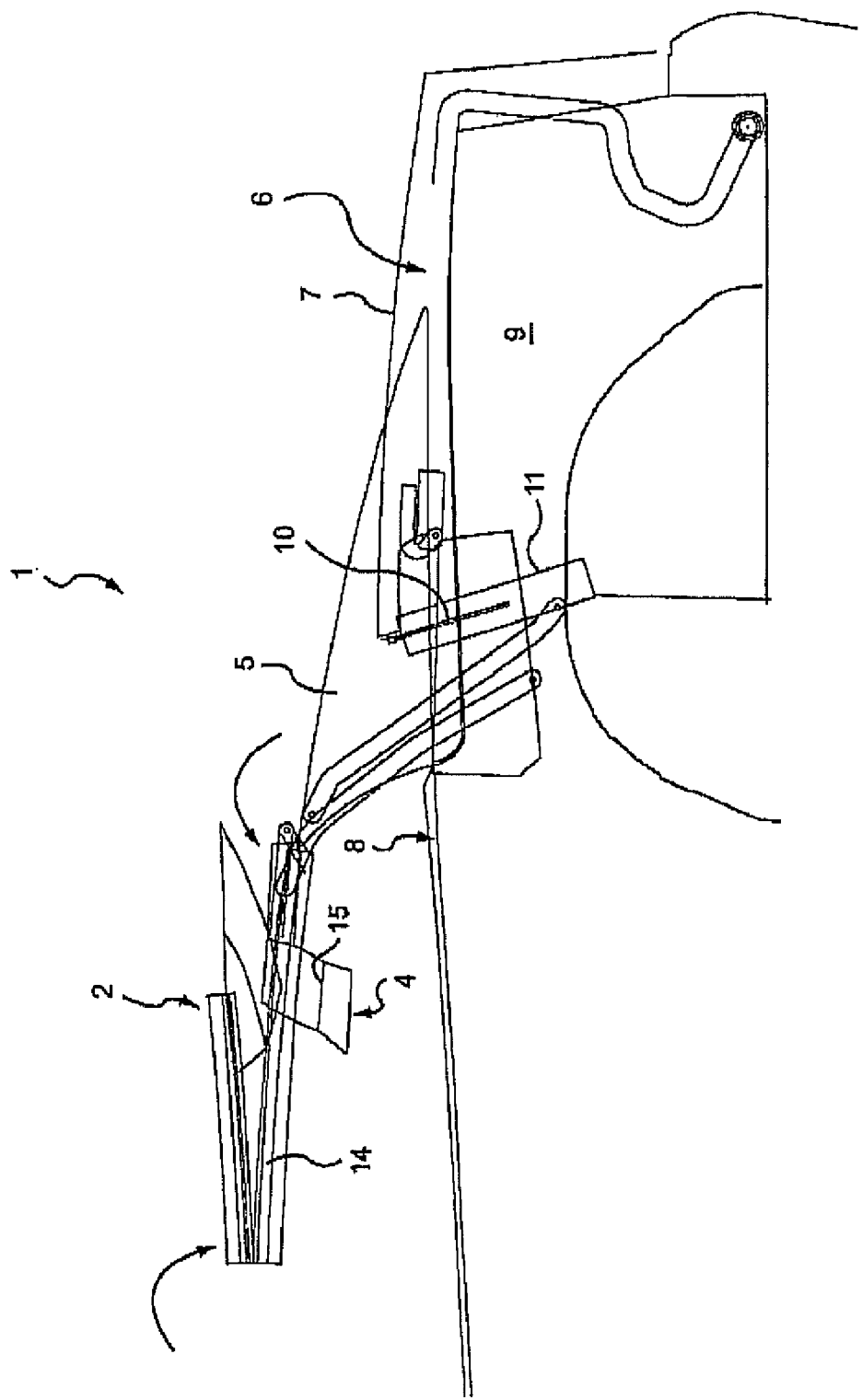
FIG. 6 the vehicle approximately in the position in accordance with FIG. 3 in a side view.
Figure 7:
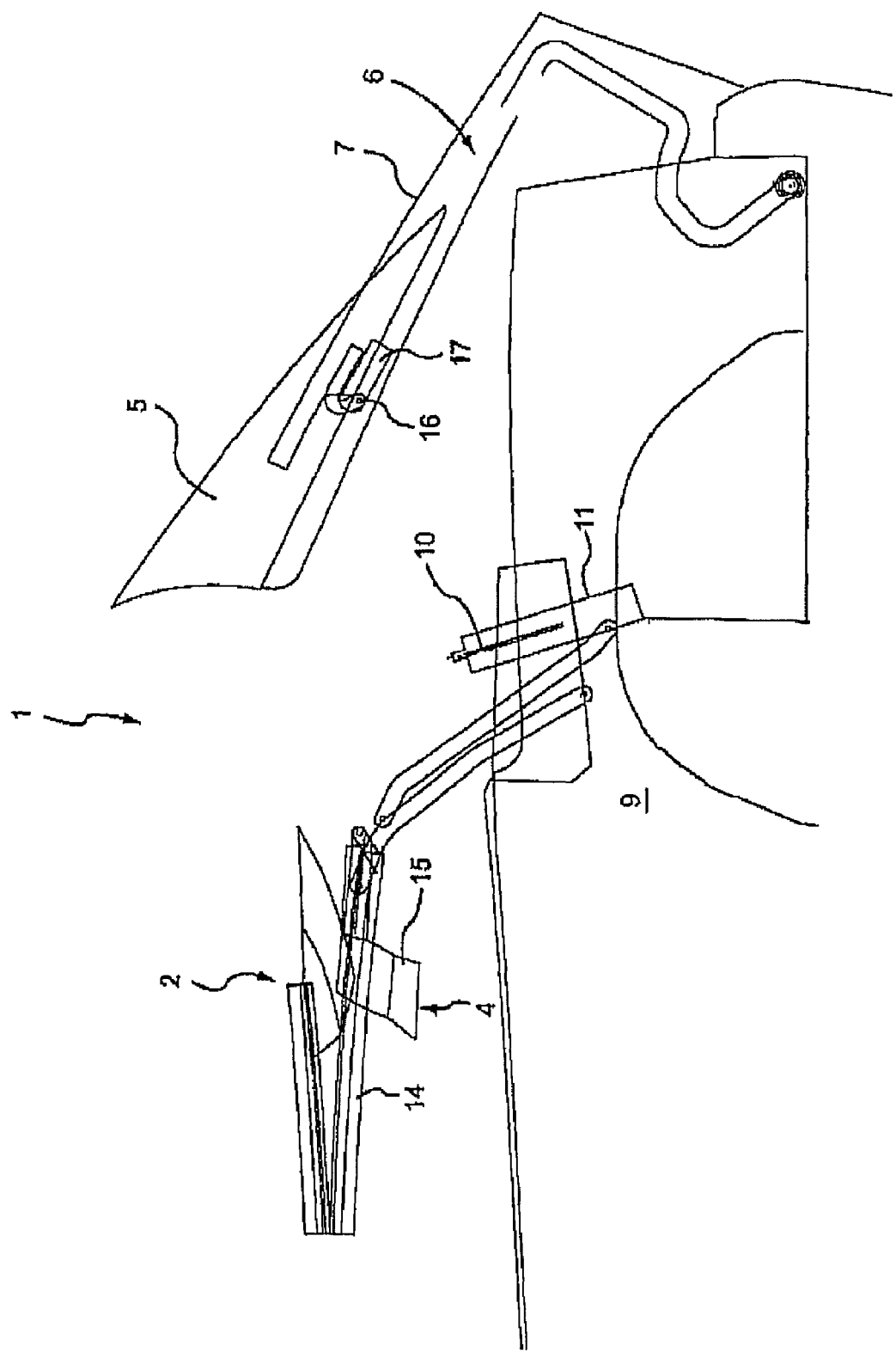
FIG. 7 shows a similar view to FIG. 6 during the opening of the cover.
Figure 8:
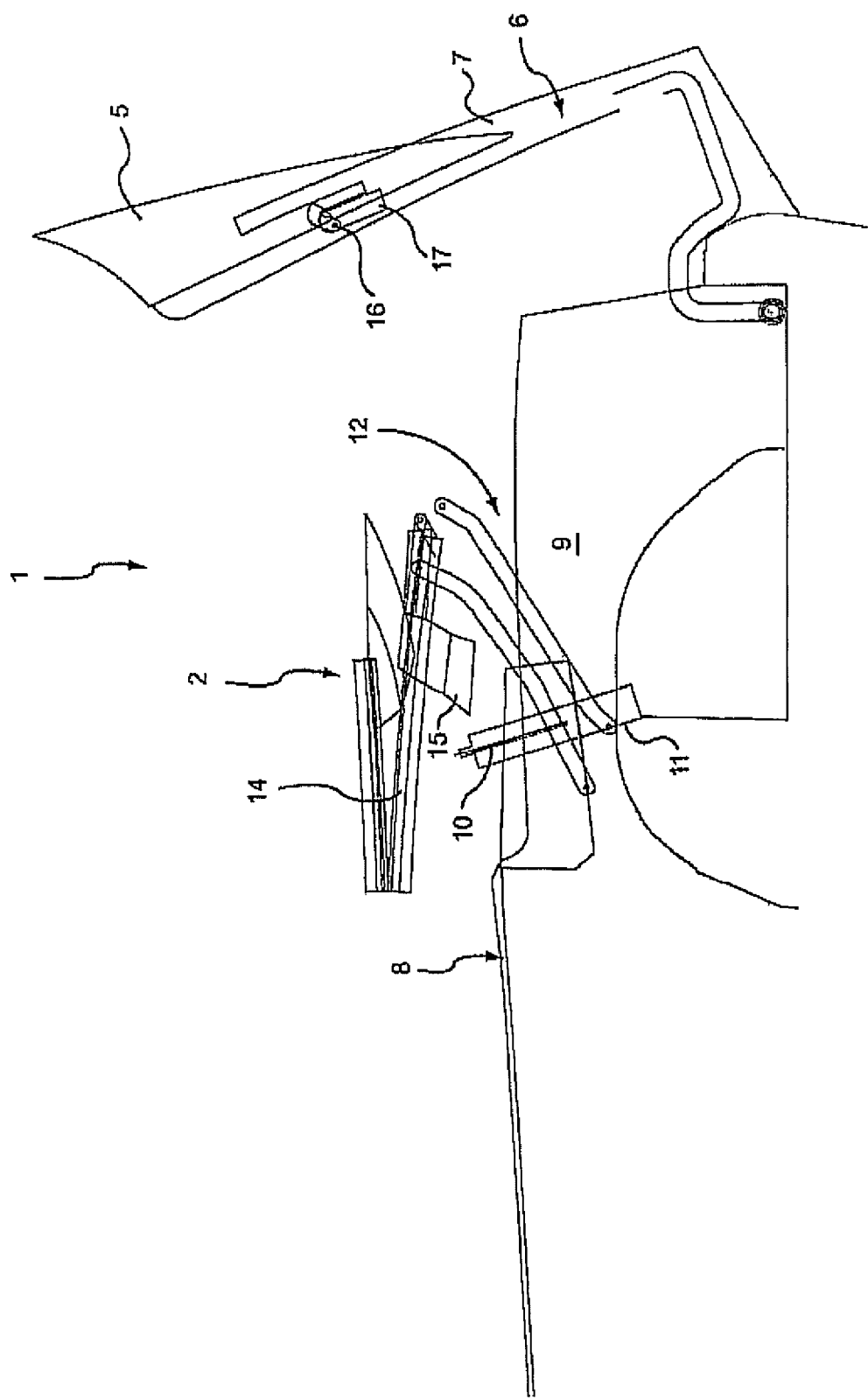
FIG. 8 shows a similar view to FIG. 7 during the displacement of the roof to the rear and downwardly with a fully open cover.
Figure 9:
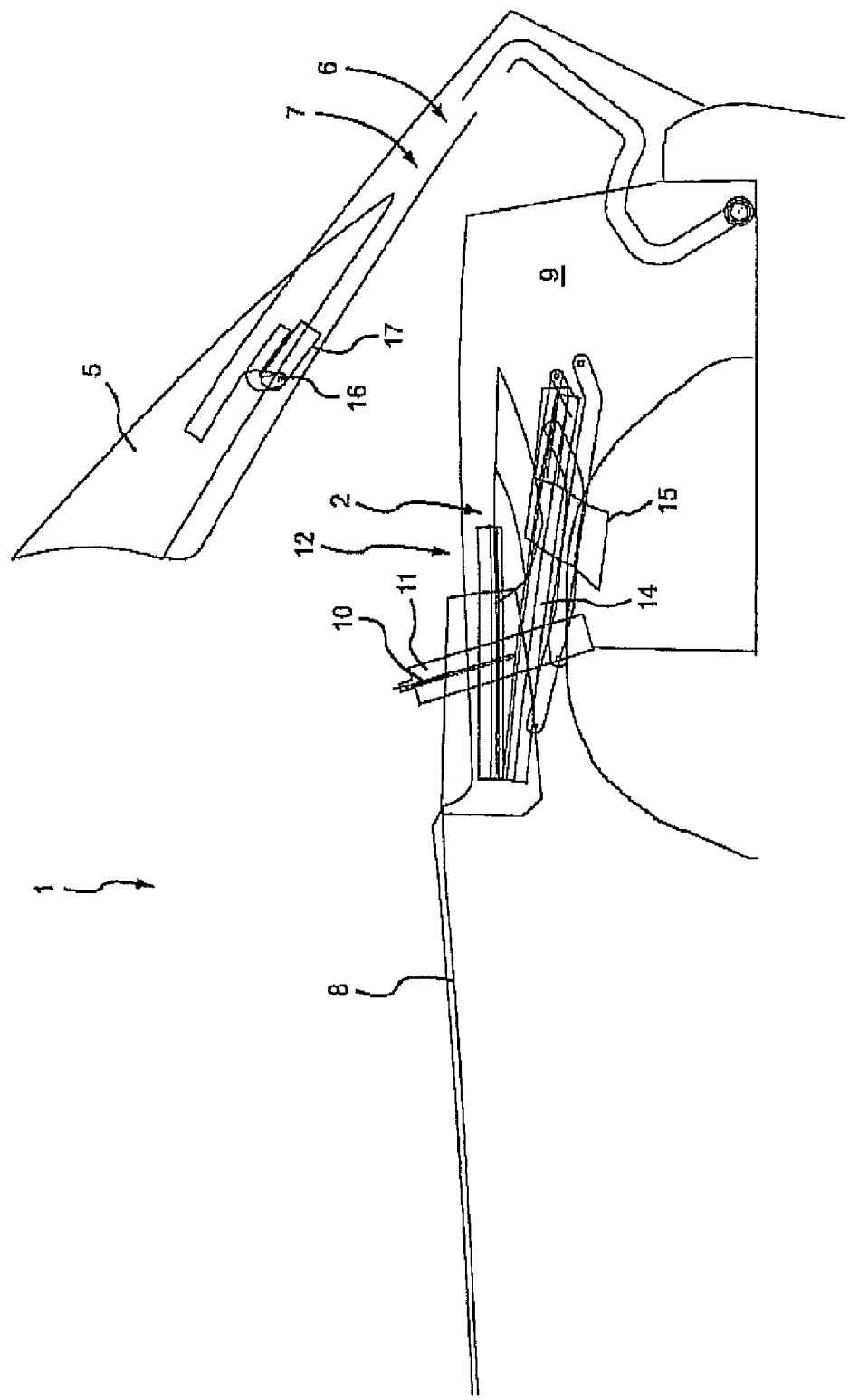
FIG. 9 shows a similar view to FIG. 8 after stowing of the roof.

FIGS. 6-8 illustrate the transition from the closed roof to a partially open position with the fins 5 still standing upright. FIGS. 11-14 illustrate the lowering of the fins 5 relative to the storage well cover 7. It is understood that a complete opening of the fins 5 is also possible in a single process.

Figure 10:
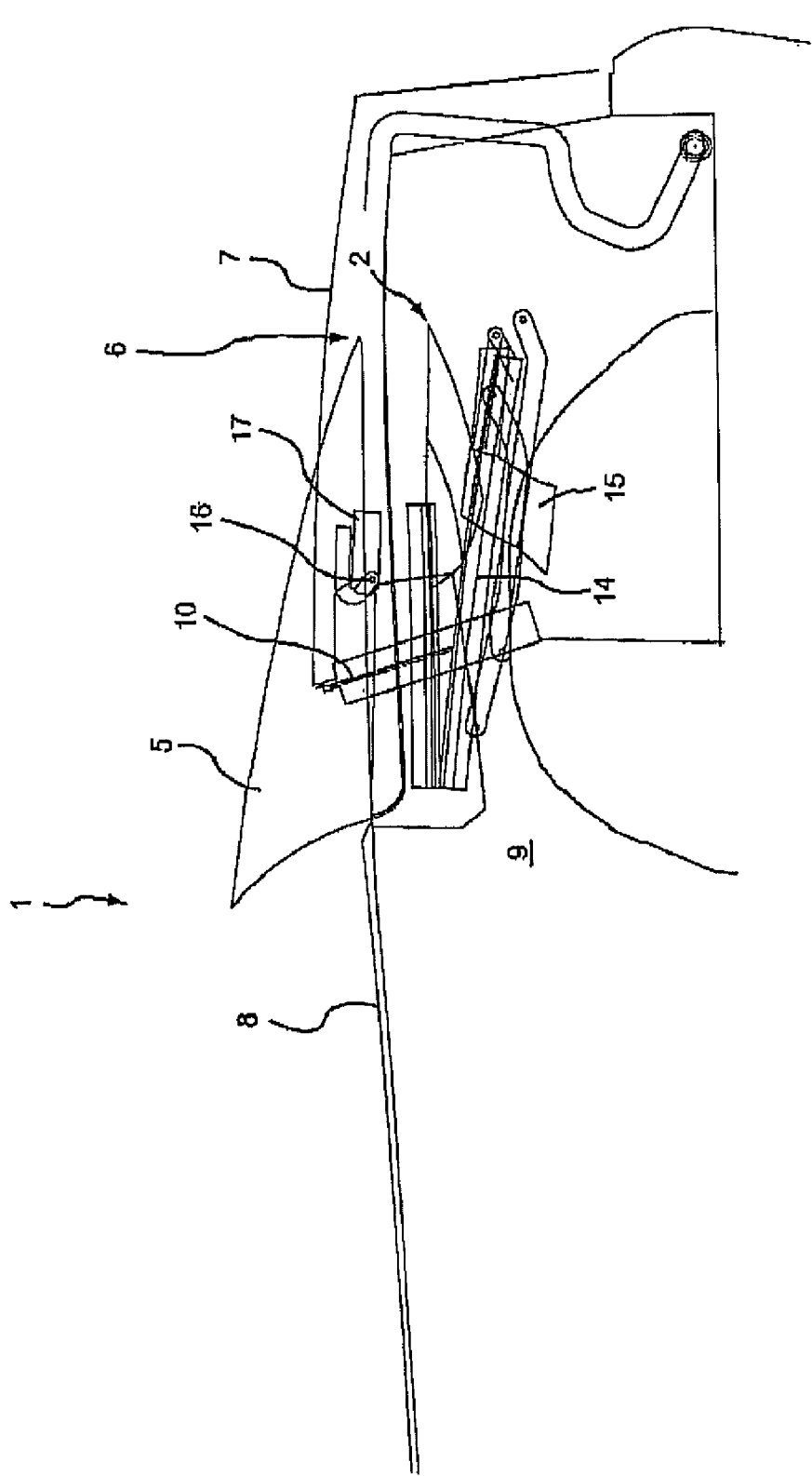
FIG. 10 shows the vehicle in part convertible position with a top storage well cover closed over the stowed roof with fins held standing upright thereon.
Figure 11:
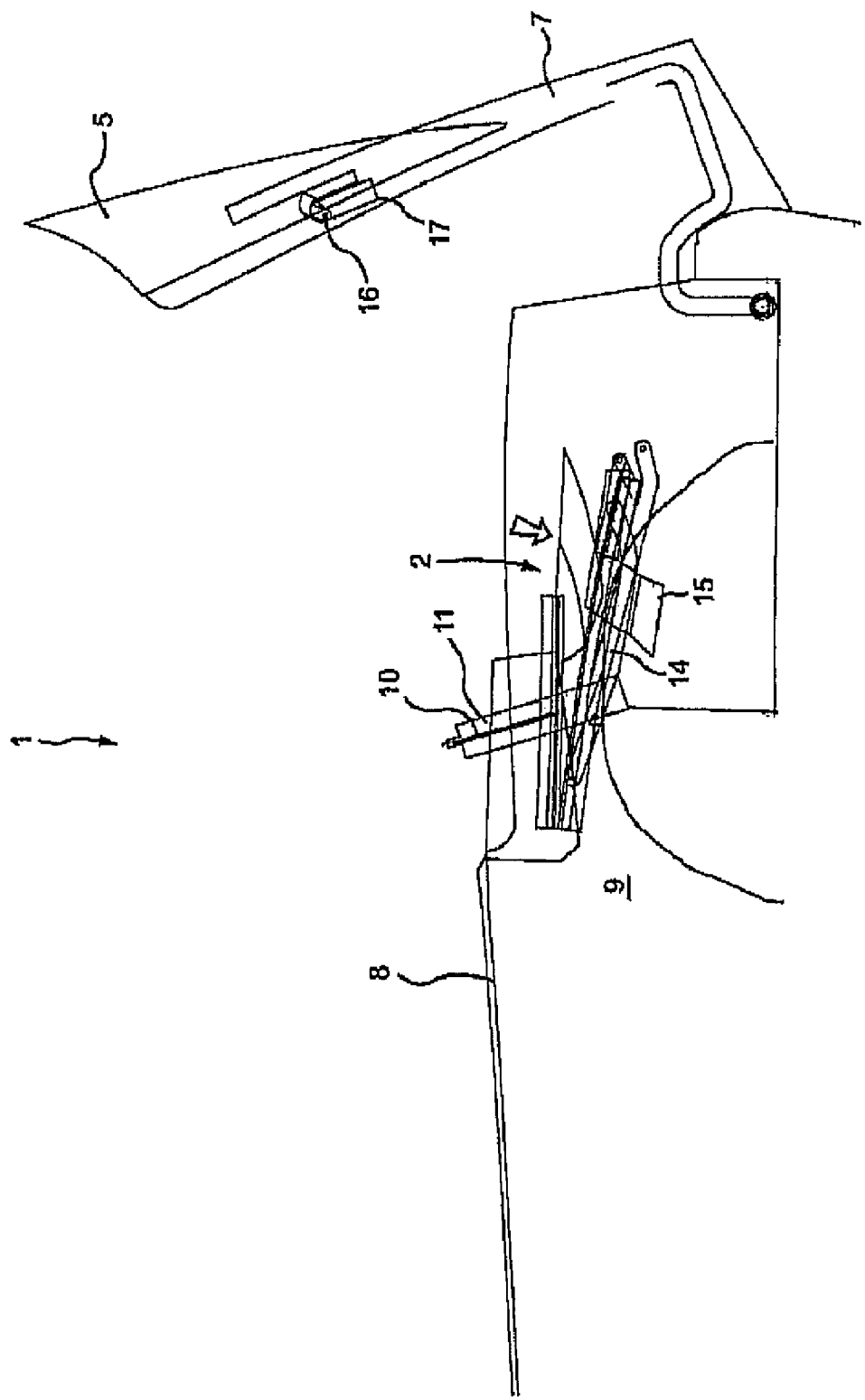
FIG. 11 shows a similar view to FIG. 10, but with an open top storage well cover and with an additionally lowered roof region.
Figure 12:
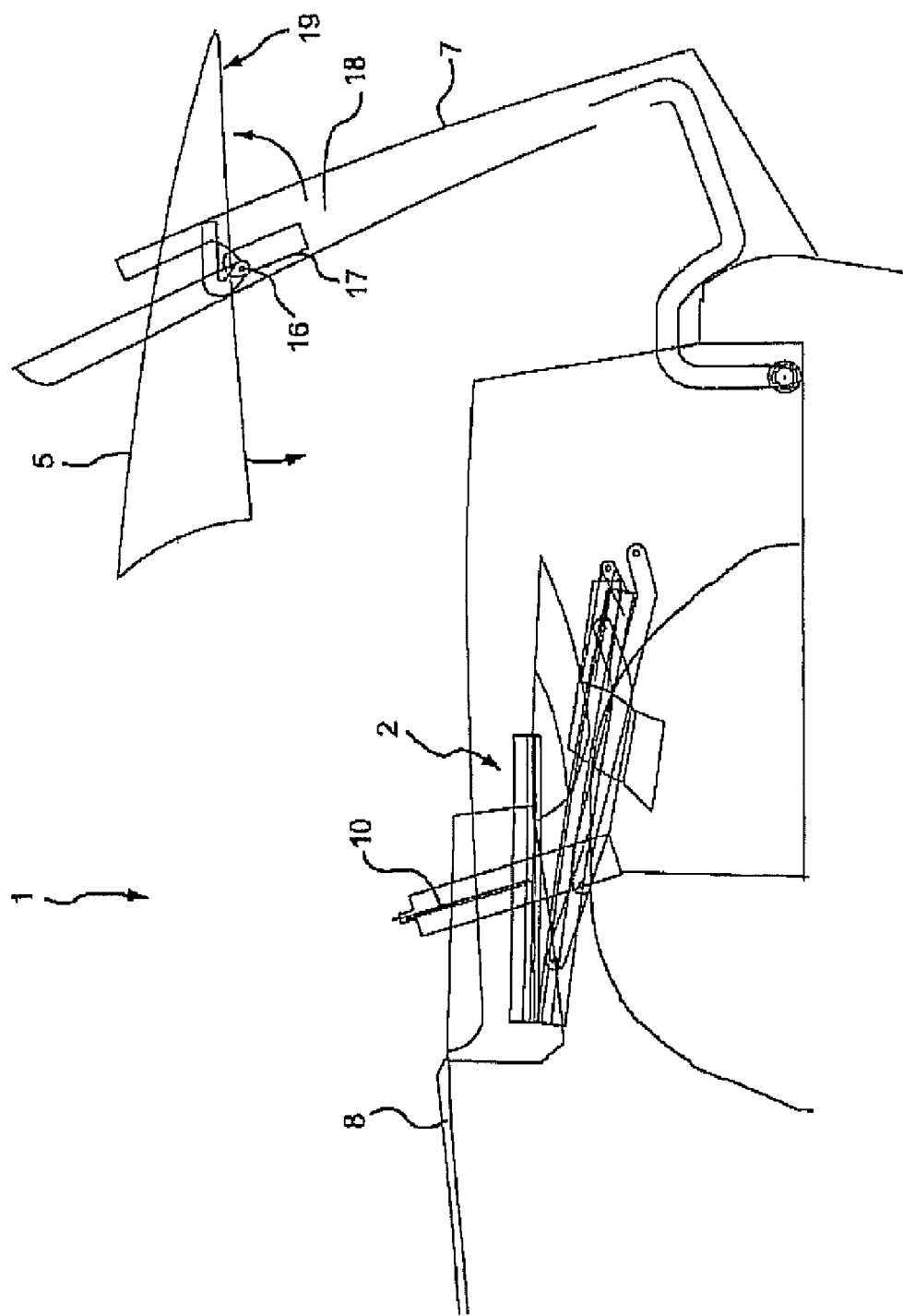
FIG. 12 shows a similar view to FIG. 11 during the inward pivoting of the lateral fins with respect to the open top storage well cover.
Figure 13:
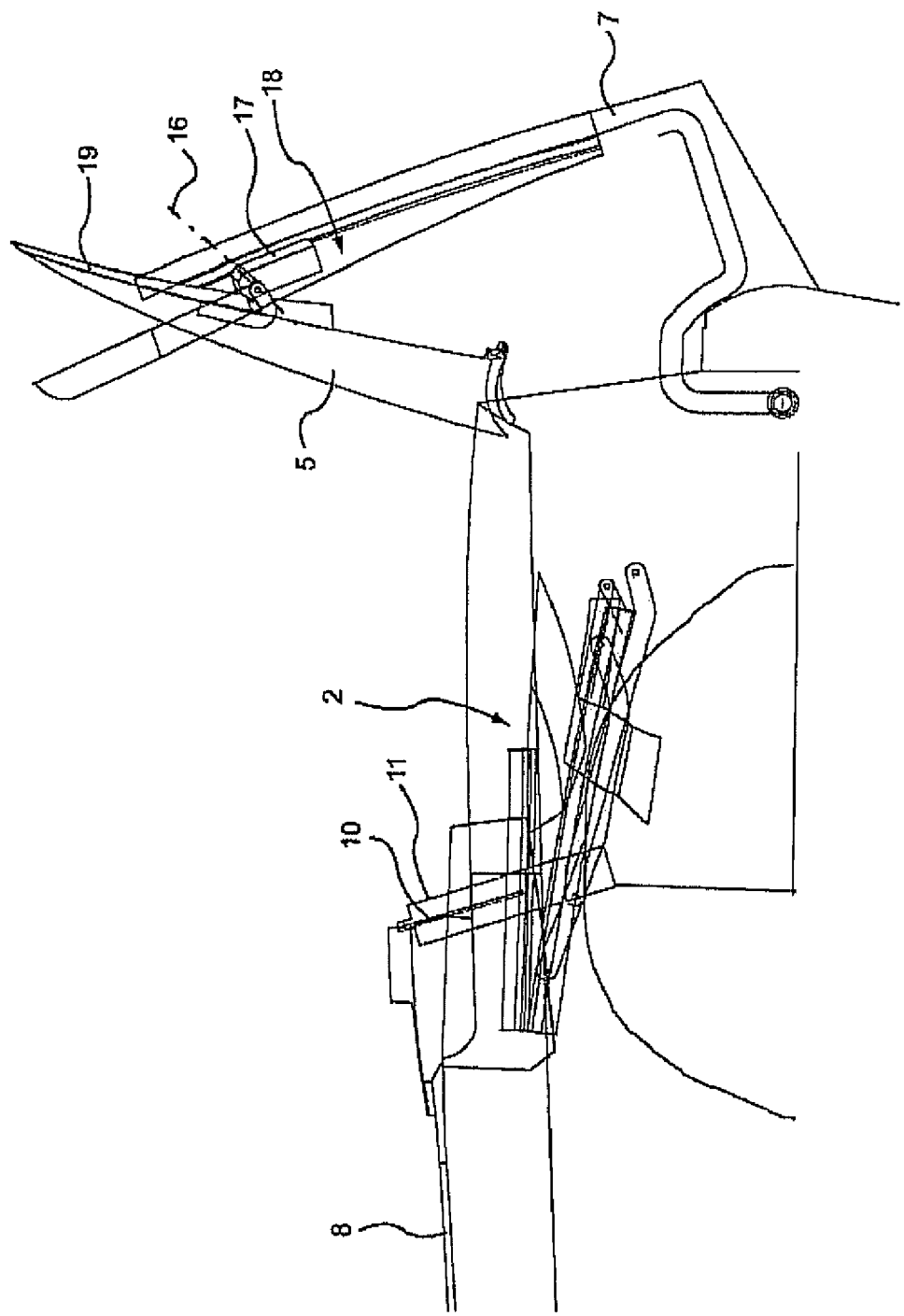
FIG. 13 shows a similar view to FIG. 12 during the further inward pivoting of the fins.
Figure 14:
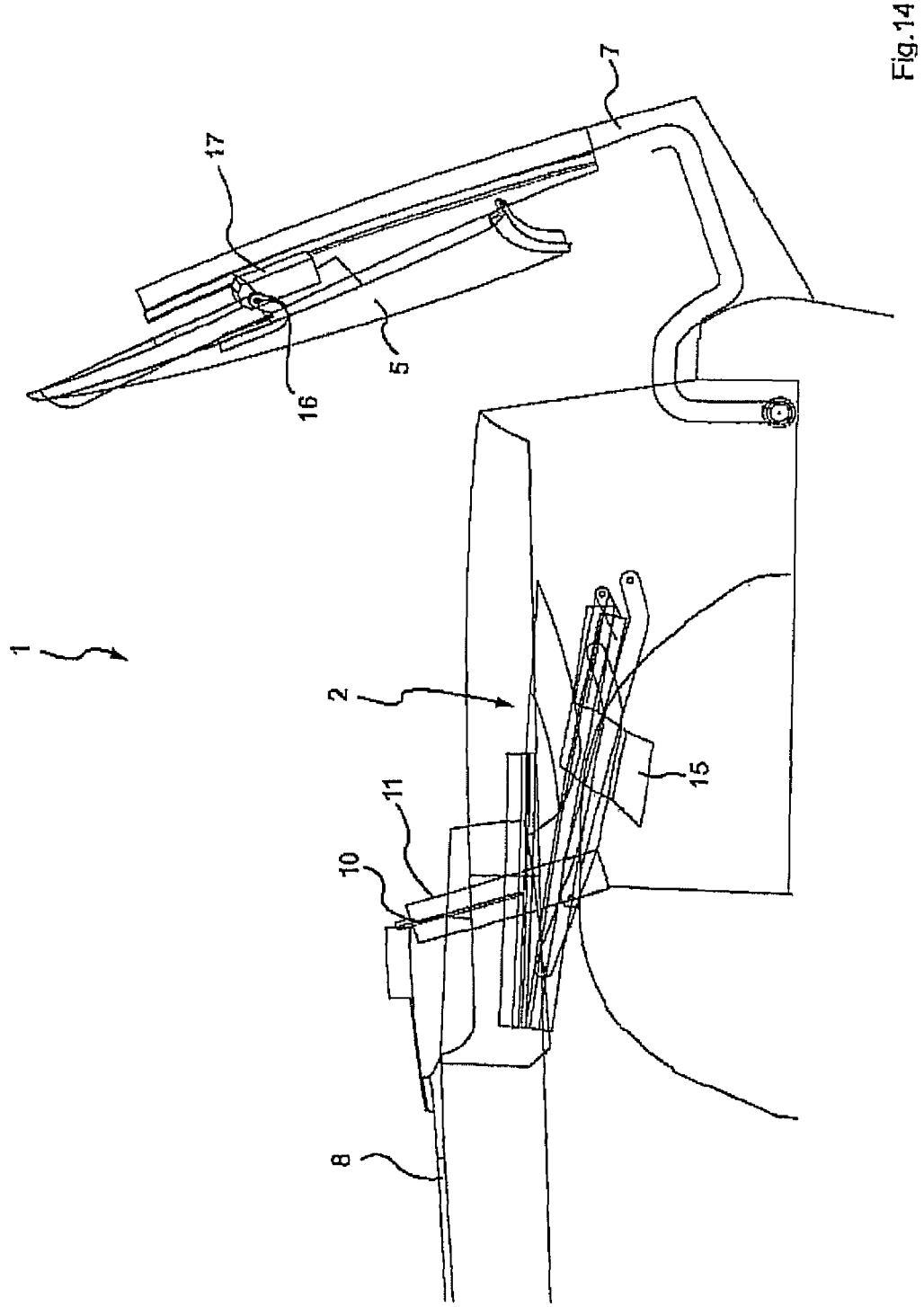
FIG. 14 shows a similar view to FIG. 13 with completely inwardly pivoted fins.
Figure 15:
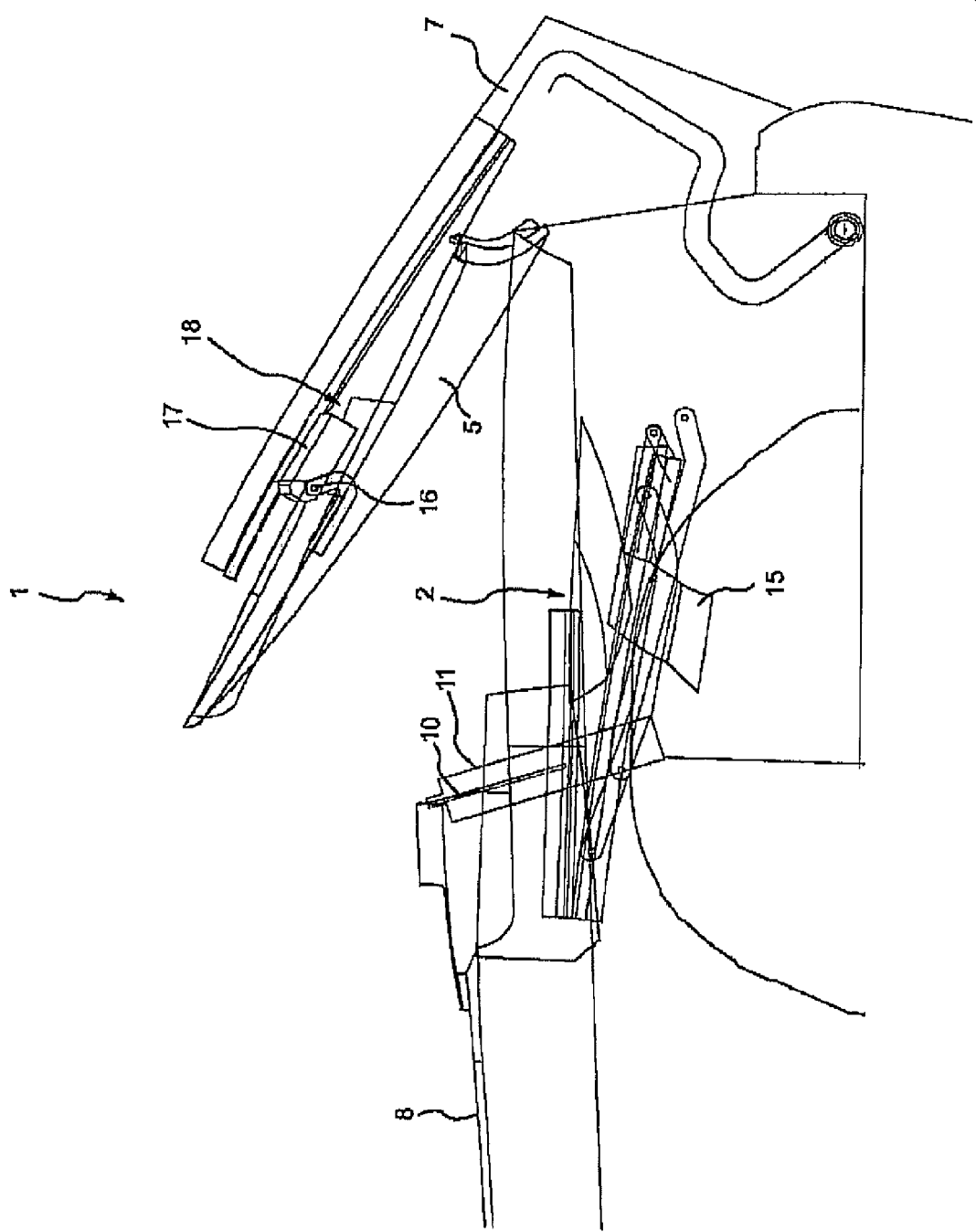
FIG. 15 shows a similar view to FIG. 14 during the closing of the top storage well cover.
Figure 16:
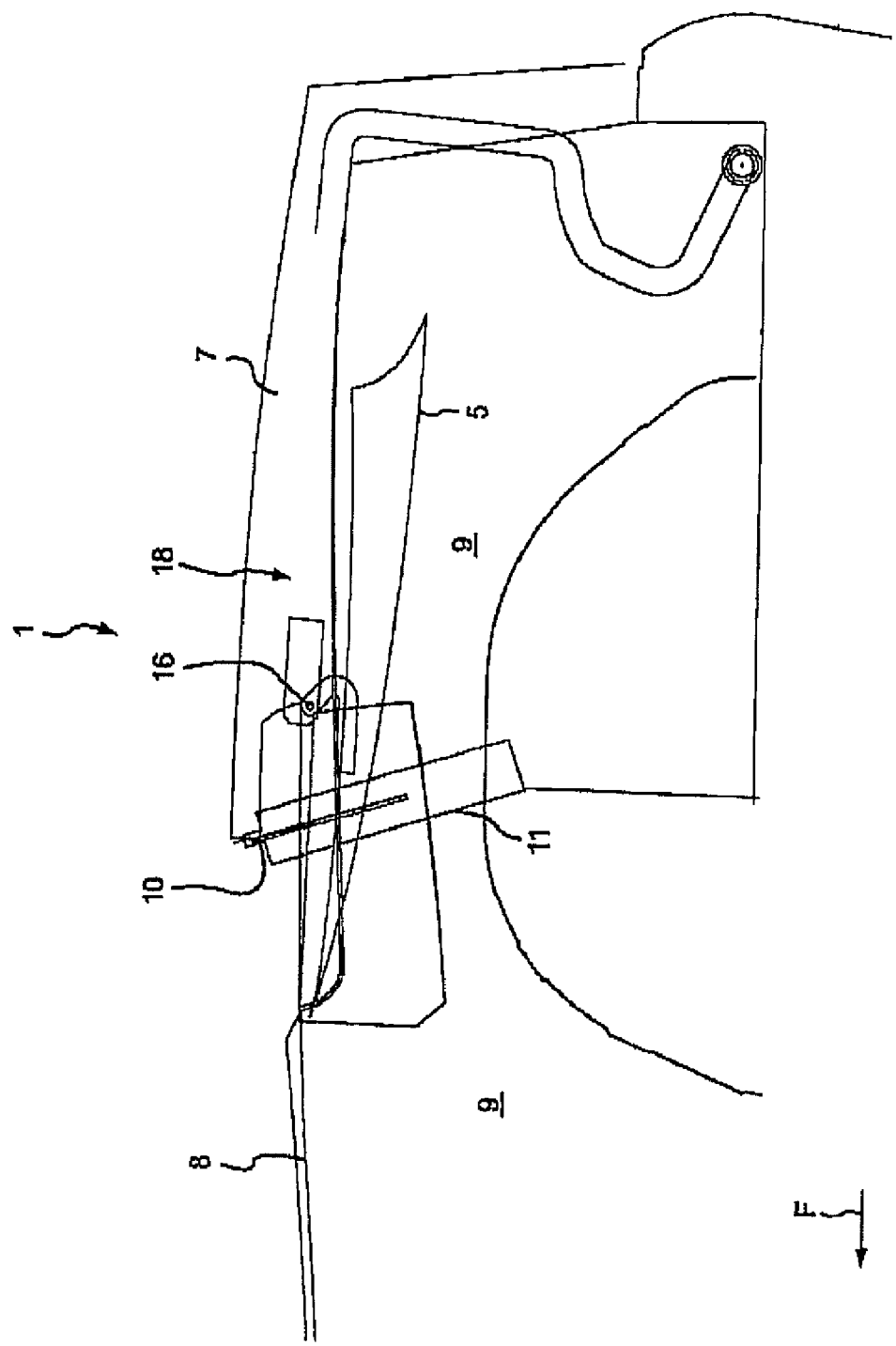

In order to provide a trunk which is as large as possible when the roof is in the partial convertible position with the fins not lowered (FIG. 10), the lowered roof assembly 2 is disposed in an elevated position with respect to the full convertible position with the fins 5 lowered. The two different height roof stowage positions both form permanent driving positions and are shown in FIG. 10 and FIG. 11 respectively.

To open the fins 5 for stowage above the stowed roof assembly 2, the fins 5 are each pivoted downwardly around the axis 16 which is also angled downwardly with respect to the transverse direction of the vehicle. A separate drive 17 may be disposed at each side or a single drive having a coupling for both sides can be disposed beneath the cover 7. When pivoting, the rear part of the fin 5 rises from the region 18 (FIGS. 12-16) of the cover 7 supporting it so that the lower rear portion of the triangular fin 5 becomes visible. A seal may be provided on this lower side but is not shown. A cut-out in the cover 7 may be provided in front of the pivot axis 16. The rear part of the outer surface of the cover does not have to be interrupted by joints.

The invention has been described in an illustrative manner. It is, therefore, to be understood that the terminology used is intended to be in the nature of words of description rather than of limitation. Many modifications and variations of the invention are possible in light of the above teachings. For example, instead of the very simple inward pivoting of the fins, other lowering mechanisms can also be provided, such as plurality of overlapping translatory and/or rotary movements. Thus, within the scope of the appended claims, the invention may be practiced other than as specifically described.

I claim:

1. A convertible roof system for a motor vehicle having a passenger compartment, a windshield frame and a storage region for stowing the roof assembly, the convertible roof system comprising:
   a storage well cover for covering the storage region;
   a movable roof assembly having a front end and a rear region with a mid portion therebetween, the roof assembly having a closed position wherein the front end is secured to the windshield frame and an open position wherein the roof assembly is stowed in the storage region;
   a flexible cover disposed on the movable roof assembly
   the rear region of the movable roof assembly having at least one rigid cross member, the rear region being in a closed position when the roof assembly is in the closed position, the rear region being rotated upwardly and forwardly to an open position wherein the rear region is turned upside down and is disposed on top of the mid portion of the roof assembly.

2. A convertible roof system in accordance with claim 1, wherein the rear region of the roof assembly is pivotable from the closed position to the open position through an angle of at least approximately 180 degrees.

3. A convertible roof system in accordance with claim 1, wherein the rear region has two lateral longitudinal frame parts which are fixedly connected to the at least one cross member, the rear region further having latching members to fix the rear region to a structure associated with the car body.

4. A convertible roof system in accordance with claim 2, wherein the front end of the movable roof assembly is movable to an open position by pivoting upwardly and rearwardly to an upside down position, the rear region being disposed under the front end when the rear region and the front end are both in the open position.

5. A convertible roof system in accordance with claim 2, wherein the front end of the movable roof assembly is movable to an open position by pivoting upwardly and rearwardly to an upside down position, the rear region being disposed on top of the front end when the rear region and the front end are both in the open position.

6. A convertible roof system in accordance with claim 3, wherein the vehicle has pillars associated with sides of the vehicle, the pillars visually extending the movable roof assembly to the rear when the movable roof assembly is closed, the latching members being provided on the at least one cross member and/or on the longitudinal frame parts, the latching members engaging the pillars.

7. A convertible roof system in accordance with claim 1, wherein the at least one cross member forms a closed or open rigid frame, the flexible cover attached to the frame.

8. A convertible roof system in accordance with claim 6, further comprising a window supported in the frame.

9. A convertible roof system in accordance with claim 6, wherein the pillars are generally upright fins which taper toward the rear of the vehicle and visually continue the roof assembly to the rear in a side view.

10. A convertible roof system in accordance with claim 9, wherein the rear region of the movable roof region assembly ends above the fins and is connected via a linkage covered by the fins to a main bearing disposed beneath a window belt line.

11. A convertible roof system in accordance with claim 9, wherein the fins are lowerable into the vehicle body to provide a full convertible position.

12. A convertible roof system in accordance with claim 9, wherein the movable roof assembly is movable to a partially open position with the fins disposed in an upright position above the roof assembly.

13. A convertible roof system in accordance with claim 9, wherein the fins and the storage well cover are movable rearwardly together to an open position.

14. A convertible roof system in accordance with claim 11, wherein the storage well cover is pivotable to an open position after the rear region is moved to the open position, the fins being lowered with the storage well cover in the open position.

15. A convertible roof system in accordance with claim 11, wherein the movable roof assembly can be stowed in an elevated position, in a partial convertible position with the fins in an upright position and can be stowed in a full convertible position with the fins lowered.

16. A convertible roof system in accordance with claim 1, wherein the at least one rigid cross member is defines a rear portion of the rear region when the movable roof is in the closed position and defines a front portion of the rear region when the rear region is turned upside down in the open position of the rear region.

* * * * *

UNITED STATES PATENT AND TRADEMARK OFFICE
CERTIFICATE OF CORRECTION

PATENT NO. : 7,740,302 B2                                    Page 1 of 1
APPLICATION NO. : 11/676014
DATED : June 22, 2010
INVENTOR(S) : Udo Heselhaus It is certified that error appears in the above-identified patent and that said Letters Patent is hereby corrected as shown below:

Column 1, line 7: Replace "DE 10 206 007 362.2" with --DE 10 2006 007 362.2--;
Column 1, line 21: Replace "retraining" with --retaining--;
Column 3, line 8: After "FIG. 6" insert --shows--;
Column 5, line 51: After "assembly" insert --;--; and
Column 6, line 58: After "member" delete "is".

Signed and Sealed this

Seventeenth Day of August, 2010

David J. Kappos
*Director of the United States Patent and Trademark Office*